United States Patent
Bhagavathiperumal et al.

(10) Patent No.: US 8,953,607 B2
(45) Date of Patent: Feb. 10, 2015

(54) INTERNET GROUP MEMBERSHIP PROTOCOL GROUP MEMBERSHIP SYNCHRONIZATION IN VIRTUAL LINK AGGREGATION

(75) Inventors: Chidambaram Bhagavathiperumal, Santa Clara, CA (US); Naveen C. Sekhara, Milpitas, CA (US); Daniel W. Tai, Cupertino, CA (US); Raluca Voicu, Bucharest (RO)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 13/438,785

(22) Filed: Apr. 3, 2012

(65) Prior Publication Data
US 2013/0259047 A1    Oct. 3, 2013

(51) Int. Cl.
*H04L 12/28* (2006.01)

(52) U.S. Cl.
USPC .......................................... 370/392

(58) Field of Classification Search
USPC ........................................ 370/218, 331.392
See application file for complete search history.

(56) References Cited

U.S. PATENT DOCUMENTS

| | | | |
|---|---|---|---|
| 6,104,696 A * | 8/2000 | Kadambi et al. | 370/218 |
| 6,188,689 B1 * | 2/2001 | Katsube et al. | 370/389 |
| 6,278,690 B1 * | 8/2001 | Herrmann et al. | 370/224 |
| 6,771,673 B1 | 8/2004 | Baum et al. | |
| 7,720,066 B2 * | 5/2010 | Weyman et al. | 370/390 |
| 7,880,622 B2 | 2/2011 | Nguyen et al. | |
| 8,009,668 B2 | 8/2011 | Bare et al. | |
| 8,018,875 B2 | 9/2011 | Belanger et al. | |
| 8,054,804 B2 * | 11/2011 | Small et al. | 370/331 |
| 8,254,386 B2 * | 8/2012 | Yadav | 370/390 |
| 8,432,788 B2 * | 4/2013 | Abdulla et al. | 370/217 |
| 2005/0243713 A1 * | 11/2005 | Okuda | 370/216 |
| 2011/0280572 A1 | 11/2011 | Vobbilisetty et al. | |

FOREIGN PATENT DOCUMENTS

WO    2009/088856 A1    7/2009

* cited by examiner

*Primary Examiner* — Hassan Kizou
*Assistant Examiner* — Abdullahi Ahmed
(74) *Attorney, Agent, or Firm* — Zilka-Kotab, PC (57) ABSTRACT

In one embodiment, a system includes at least one local processor adapted for executing logic, logic adapted for receiving a packet from an access switch on a virtual link aggregation (vLAG) port of a first switch, logic adapted for modifying a source media access control (MAC) address of the packet to include a MAC address of the first switch, wherein a last byte of the modified source MAC address includes a trunk identifier of the vLAG port on which the packet was received, and logic adapted for forwarding the packet to an inter-switch link (ISL) port. Other systems, methods, and computer program products are presented according to more embodiments.

20 Claims, 6 Drawing Sheets

INTERNET GROUP MEMBERSHIP PROTOCOL GROUP MEMBERSHIP SYNCHRONIZATION IN VIRTUAL LINK AGGREGATION

BACKGROUND

The present invention relates to network switches and switching, and more particularly, this invention relates to providing internet group management protocol (IGMP) group membership synchronization in a virtual link aggregation group (vLAG).

Figure 3:
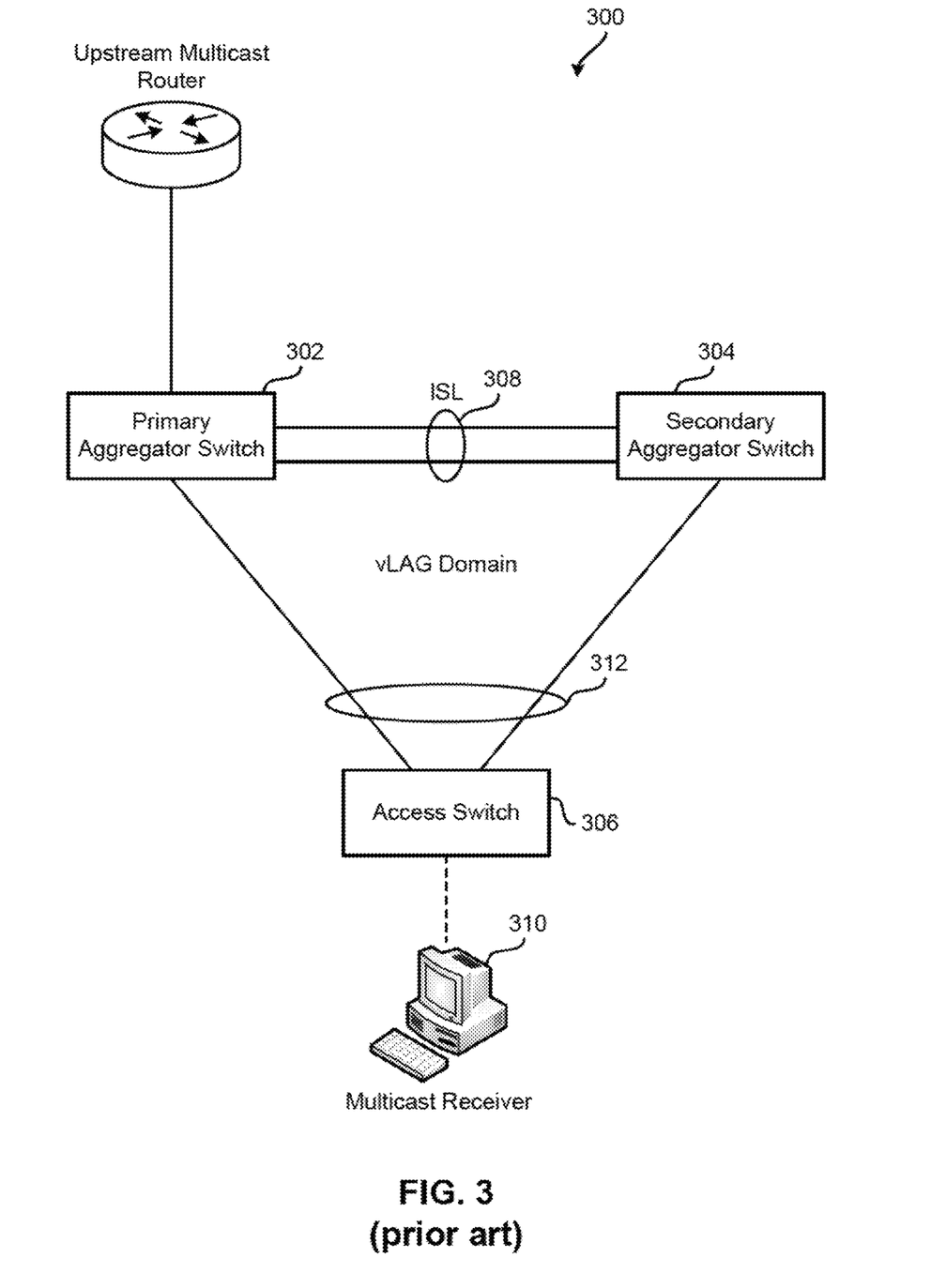
FIG. 3 is a diagram of a system, according to the prior art.

In a data center, an example of which is shown in FIG. 3 according to the prior art, each access switch 306 is typically connected to two aggregation switches for redundancy, for example, primary switch 302 and secondary switch 304. vLAG is a feature that utilizes all available bandwidth without sacrificing redundancy and connectivity. The feature extends link aggregation across the switch boundary at the aggregation layer. Thus, an access switch 306 has all its uplinks in a LAG 312 while the aggregation switches 302, 304 cooperate with each other to maintain this vLAG.

Since vLAG is an extension to standard link aggregation, layer 2 and layer 3 features may be supported on top of vLAG. In the system 300 shown in FIG. 3, both primary aggregator switch 302 and secondary aggregator switch 304 have IGMP snooping enabled. When the IP multicast receiver 310 connected to the access switch 306 sends an IGMP report, the packet is forwarded to only one of the aggregator switches (either primary 302 or secondary 304) and an IP multicast group entry will be created in the switch the packet is sent to. This IP multicast group information needs to synchronize with the peer device (the other aggregator switch to which the packet was not sent) for future traffic forwarding and redundancy purposes.

In conventional methods, synchronization of these multicast group entries are achieved via special synchronization packets sent between the peer devices (primary switch 302 and secondary switch 304) using an inter-switch link (ISL) 308. However, there are disadvantages with this approach, such as a reliable synchronization mechanism being needed, and that IP multicast data forwarding may be done only when the IP multicast group entries that are learned on the secondary switch 304 are synchronized to the primary switch 302, which adds a latency to the traffic flow through the system 300.

SUMMARY

In one embodiment, a system includes at least one local processor adapted for executing logic, logic adapted for receiving a packet from an access switch on a virtual link aggregation (vLAG) port of a first switch, logic adapted for modifying a source media access control (MAC) address of the packet to include a MAC address of the first switch, wherein a last byte of the modified source MAC address includes a trunk identifier of the vLAG port on which the packet was received, and logic adapted for forwarding the packet to an inter-switch link (ISL) port.

In another embodiment, a computer program product includes a computer readable storage medium having computer readable program code embodied therewith, the computer readable program code including computer readable program code configured for receiving a packet from an access switch on a vLAG port of a first switch, computer readable program code configured for modifying a source MAC address of the packet to include a MAC address of the first switch, wherein a last byte of the modified source MAC address includes a trunk identifier of the vLAG port on which the packet was received, and computer readable program code configured for forwarding the packet to an ISL port.

In yet another embodiment, a method includes receiving a packet from an access switch on a vLAG port of a first switch, modifying a source MAC address of the packet to include a MAC address of the first switch, wherein a last byte of the modified source MAC address includes a trunk identifier of the vLAG port on which the packet was received, and forwarding the packet to an ISL port.

According to yet another embodiment, a system includes at least one local processor adapted for executing logic, logic adapted for receiving an internet group management protocol (IGMP) report packet from an access switch on a vLAG port of a first aggregator switch, logic adapted for modifying a source MAC address of the packet to include a MAC address of the first aggregator switch, wherein a last byte of the modified source MAC address includes a trunk identifier of the vLAG port on which the packet was received, and logic adapted for forwarding the packet to an ISL port on to a second aggregator switch, wherein the second aggregator switch uses the vLAG trunk identifier to configure data forwarding between the first aggregator switch and the second aggregator switch.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a system includes at least one local processor adapted for executing logic, logic adapted for receiving a packet from an access switch on a virtual link aggregation (vLAG) port of a first switch, logic adapted for modifying a source media access control (MAC) address of the packet to include a MAC address of the first switch, wherein a last byte of the modified source MAC address includes a trunk identifier of the vLAG port on which the packet was received, and logic adapted for forwarding the packet to an inter-switch link (ISL) port.

In another general embodiment, a computer program product includes a computer readable storage medium having computer readable program code embodied therewith, the computer readable program code including computer readable program code configured for receiving a packet from an access switch on a vLAG port of a first switch, computer readable program code configured for modifying a source MAC address of the packet to include a MAC address of the first switch, wherein a last byte of the modified source MAC address includes a trunk identifier of the vLAG port on which the packet was received, and computer readable program code configured for forwarding the packet to an ISL port.

In yet another general embodiment, a method includes receiving a packet from an access switch on a vLAG port of a first switch, modifying a source MAC address of the packet to include a MAC address of the first switch, wherein a last byte of the modified source MAC address includes a trunk identifier of the vLAG port on which the packet was received, and forwarding the packet to an ISL port.

According to yet another general embodiment, a system includes at least one local processor adapted for executing logic, logic adapted for receiving an internet group management protocol (IGMP) report packet from an access switch on a vLAG port of a first aggregator switch, logic adapted for modifying a source MAC address of the packet to include a MAC address of the first aggregator switch, wherein a last byte of the modified source MAC address includes a trunk identifier of the vLAG port on which the packet was received, and logic adapted for forwarding the packet to an ISL port on to a second aggregator switch, wherein the second aggregator switch uses the vLAG trunk identifier to configure data forwarding between the first aggregator switch and the second aggregator switch.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
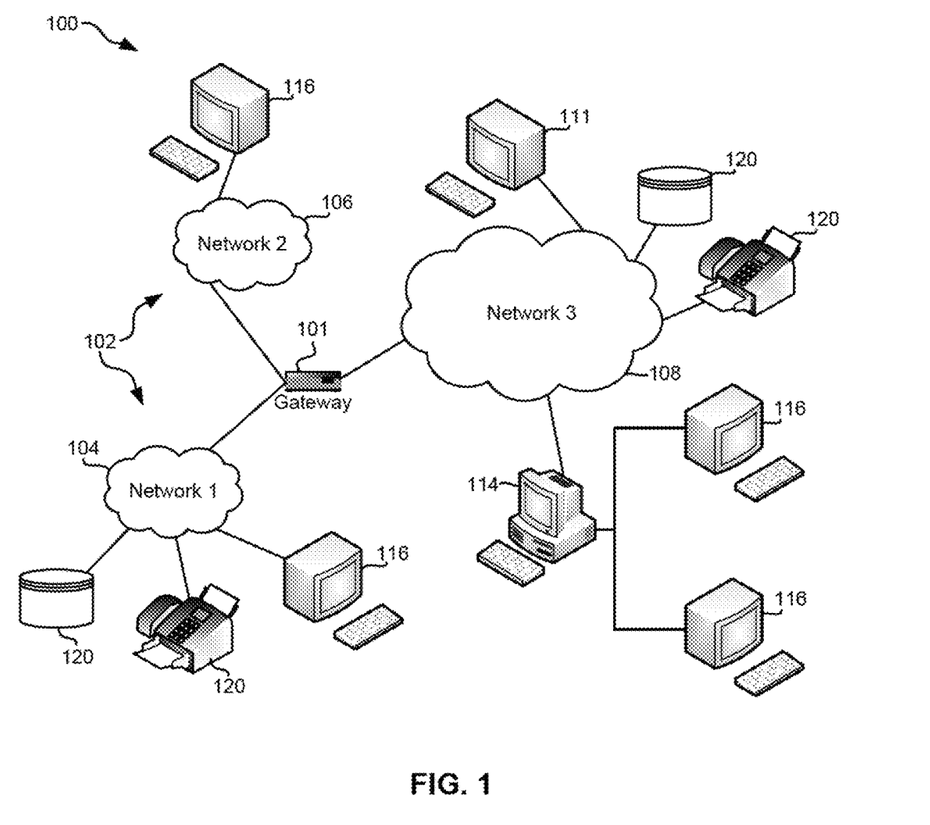
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
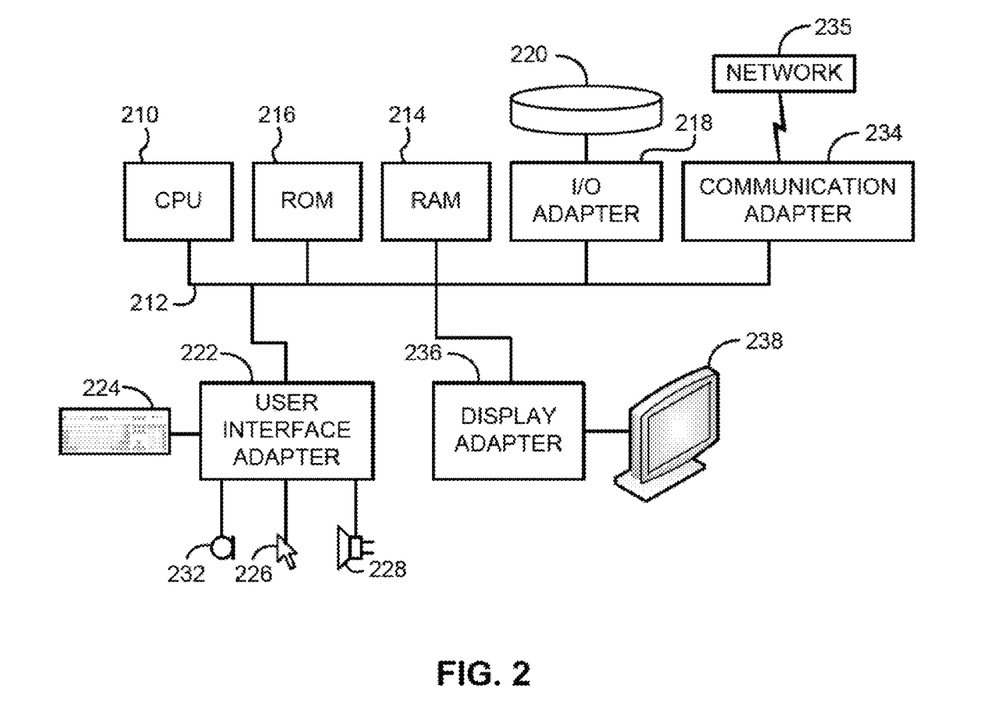
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit 210, such as a microprocessor, and a number of other units interconnected via a system bus 212, according to one embodiment.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 4:
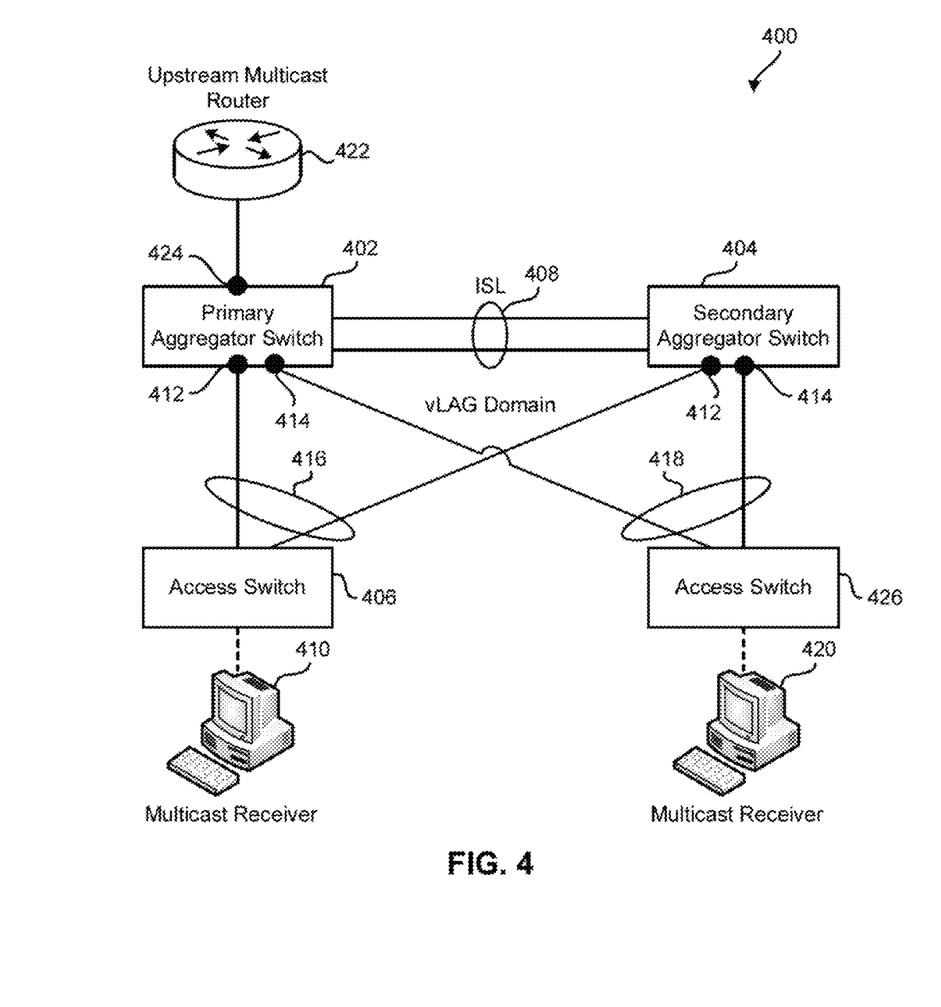
FIG. 4 is a diagram of a system, according to one embodiment.

Referring now to FIG. 4, a system 400 is shown according to one embodiment. In this system 400, all interne group management protocol (IGMP) packets are received by both a primary switch or device 402 and a secondary switch or device 404. An IP multicast group entry no longer needs to be explicitly synchronized between the primary switch 402 and the secondary switch 404, as when using conventional methods and/or systems.

As shown in FIG. 4, the upstream multicast router 422 is used to route traffic from an internet service provider (ISP) to local multicast receivers 410, 420. Each local multicast receiver 410, 420 uses IGMP group information from the local host/receivers. Multicast routers 422, which may be protocol independent multicast (PIM) or IGMP, send periodic IGMP queries/PIM hello messages in the downstream direction. On receiving these messages, IGMP snooping enabled switches are able to identify and learn the port on which the IGMP queries/PIM hello messages were received as a multicast router connected port 424. IGMP joins or IGMP leaves received from the local hosts are forwarded to the multicast routers 422 so that the multicast routers 422 have group membership information. This information may be used for forwarding multicast traffic from the ISP to the multicast receivers 410, 420.

The access switch 406 sends packets out on a first vLAG 416, which corresponds to vLAG port A 412, while access switch 408 sends packets out on a second vLAG 418 which corresponds to vLAG port B 414, in one approach. Any access switch known in the art may be used for the access switches 406, 426, according to various embodiments.

In one approach, the primary switch 402 and the secondary switch 404 may be aggregator switches, of a type known in the art. In this way, the connections between the multicast receiver 410 and the upstream multicast router 422 may be redundant. The aggregator switches 402, 404 may allow multiple Ethernet links to be split across multiple switches, preventing any single point of failure, and additionally allowing all switches to be load balanced across the multiple aggregation switches from the single access switch 406, 426.

When the primary aggregator switch 402 and/or the secondary aggregator switch 404 receive an IGMP packet from one or more virtual link aggregation group (vLAG) ports (such as vLAG port A 412 or vLAG port B 414), a source media access control (MAC) address of the received IGMP packet is modified to be a switch MAC address of the aggregator switch associated with the vLAG port on which the IGMP packet was received (e.g., vLAG port A 412 for the secondary aggregator switch 404 or vLAG port B 414 for the primary aggregator switch 402) and the IGMP packet is forwarded to the ISL port.

The last byte (LSB) of the source MAC address includes a trunk identifier (for the vLAG port) and/or trunk ID information for the vLAG port on which the IGMP packet was received. According to one approach, this trunk identifier may be used to program the receiver vLAG trunk identifier on the peer switch for data forwarding. IGMP reports received on non-vLAG ports are not modified, in some approaches.

In one example, referring to FIG. 4, when the multicast receiver 410 connected to an access switch 406 sends an IGMP report (which includes one or more packets), the access switch 406 sends the report towards the secondary aggregator switch 404, perhaps based on LAG hashing or some other rationale. Of course, the report may be sent to the primary aggregator switch 402 in some approaches. The secondary aggregator switch 404 learns the IP multicast group entry on vLAG port A 412. The IGMP report is then forwarded to the primary aggregator switch 402 via the ISL 408 with the source MAC address changed to the secondary aggregator switch 404 base MAC address with trunk ID information for the vLAG port A 412 in the LSB (for example, if the secondary aggregator switch 404 base MAC address is 00:11:22:33:44:00, the forwarded IGMP report will have a source MAC address set to 00:11:22:33:44:XX, where XX is the trunk ID information of vLAG port. A 412).

Similarly, if the multicast receiver 420 connected to access switch 426 sends an IGMP report (which includes one or more packets), the access switch 426 may send the report towards the primary aggregator switch 402, perhaps based on LAG hashing or some other rationale. Of course, the report may be sent to the secondary aggregator switch 404 in some approaches. The primary aggregator switch 402 learns the IP multicast group entry on vLAG port B 414. The IGMP report is then forwarded to the secondary aggregator switch 404 via the ISL 408 with the source MAC address changed to the primary aggregator switch 402 base MAC address with trunk ID information for the vLAG port B 414 in the LSB (for example, if the primary aggregator switch 402 base MAC address is 00:11:22:33:44:00, the forwarded IGMP report will have a source MAC address set to 00:11:22:33:44:XX, where XX is the trunk ID information of vLAG port B 414).

Figure 5:
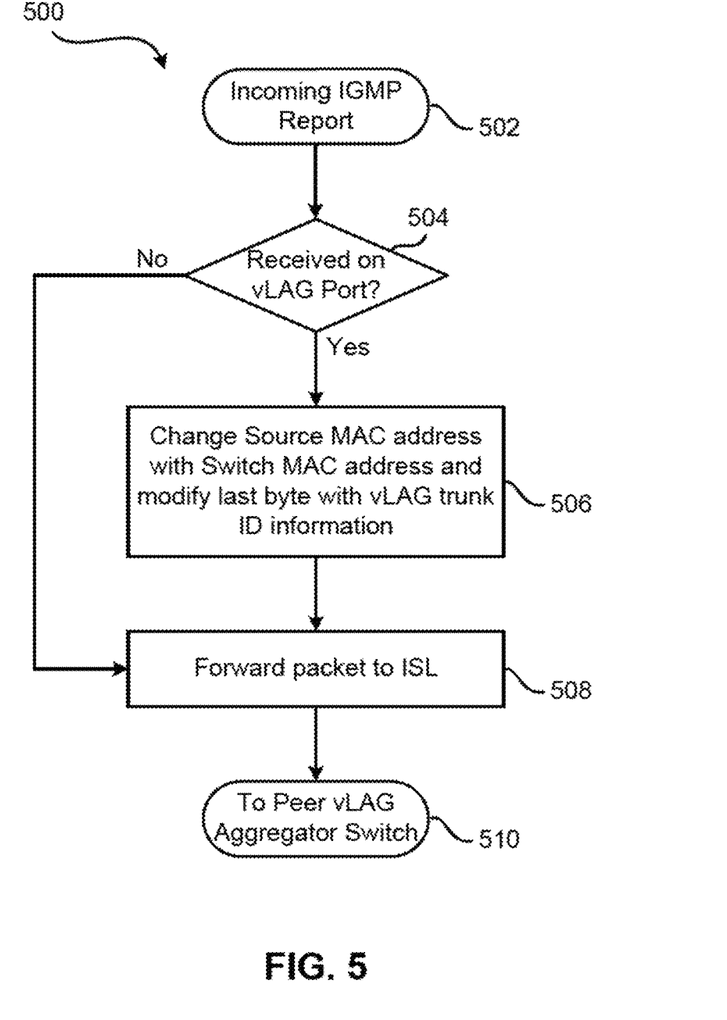
FIG. 5 is a flowchart of a method, according to one embodiment.

Now referring to FIG. 5, a flowchart of a method 500 is shown, according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by an aggregator switch, in one approach, as described herein in more detail.

As shown in FIG. 5, method 500 may initiate with operation 502, where an incoming IGMP report is received at an aggregator switch. The report may be in the form of a packet, in one embodiment.

In operation 504, it is decided if the report is received on a vLAG port of the aggregator switch or not. If it is received on a vLAG port, the method 500 continues on to operation 506; otherwise, the method 500 jumps to operation 508.

In operation 506, the source MAC address is changed to the switch MAC address of the aggregator switch which received the report. Also, the last byte of the modified source MAC address is changed to include vLAG trunk ID information for the vLAG port on which the report was received. For example, if the switch MAC address is 11:22:33:44:00, and the vLAG trunk ID information is 41, then the source MAC address of the IGMP report packet is changed to 11:22:33:44:41.

In operation 508, the packet is forwarded to the ISL. If the packet was not received on a vLAG port, then it is forwarded unmodified to the ISL.

In operation 510, the packet is forwarded along the ISL to a peer vLAG aggregator switch. The peer aggregator switch may then use the vLAG trunk ID information to configure the receiver vLAG trunk identifier on the peer aggregator switch for data forwarding, in some approaches.

According to various embodiments, the method 500 may be performed by a system, computer, or some other device capable of executing commands, logic, etc., as would be understood by one of skill in the art upon reading the present descriptions.

Figure 6:
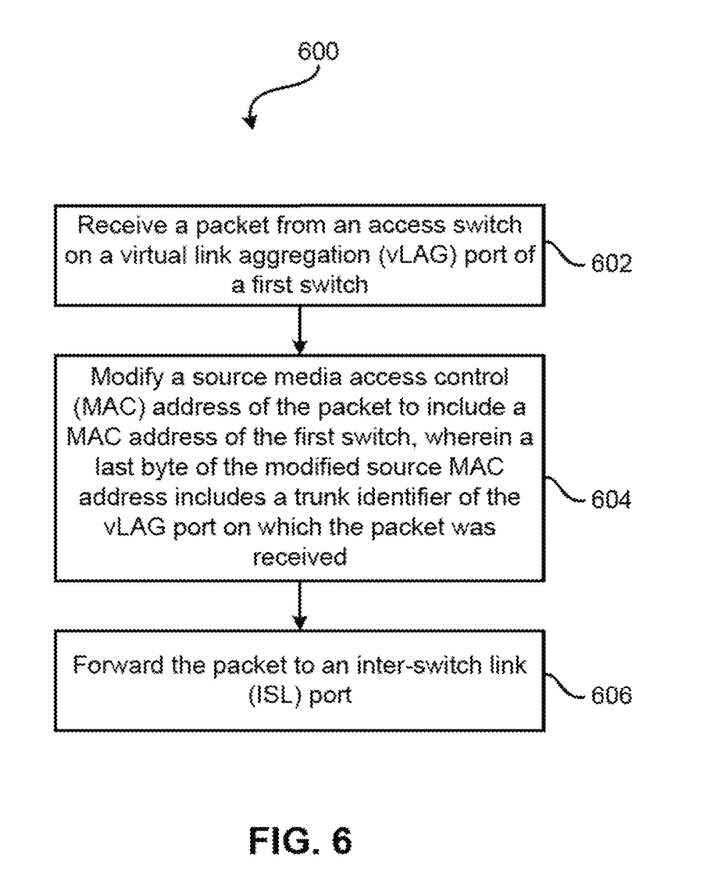
FIG. 6 is a flowchart of a method, according to one embodiment.

Now referring to FIG. 6, a flowchart of a method 600 is shown, according to one embodiment. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by an aggregator switch, in one approach, as described herein in more detail.

Optional operations described below are those operations which may be omitted, or may be performed once while other operations are performed multiple times, or may be performed by other entities are systems and relied upon by other operations, according to various embodiments.

As shown in FIG. 6, method 600 may initiate with operation 602, where a packet is received from an access switch on a vLAG port of a first switch.

In operation 604, a source MAC address of the packet is modified to include a MAC address of the first switch. In addition, a last byte of the modified source MAC address is modified to include a trunk identifier of the vLAG port on which the packet was received, as would be understood by one of skill in the art upon reading the present descriptions.

In operation 606, the packet is forwarded to an ISL port.

In one approach, an IGMP report may comprise the packet or the packet may comprise the IGMP report.

In another approach, the packet may be further sent to a second switch upon being forwarded to the ISL port. In a further approach, the second switch may use the vLAG trunk identifier to configure data forwarding between the first switch and the second switch.

In any approach, the first switch and the second switch may be aggregator switches.

Furthermore, in some embodiments, a packet received on a port other than a vLAG port may not be modified prior to forwarding the packet to the ISL. The packet is simply forwarded to the ISL per the forwarding MAC address in the packet without any changes.

According to various embodiments, the method 600 may be performed by a system, computer, or some other device capable of executing commands, logic, etc., as would be understood by one of skill in the art upon reading the present descriptions.

In one such embodiment, a computer program product comprises a computer readable storage medium having computer readable program code embodied therewith. The computer readable program code comprises: computer readable program code configured for receiving a packet from an access switch on a vLAG port of a first switch, computer readable program code configured for modifying a source MAC address of the packet to include a MAC address of the first switch, wherein a last byte of the modified source MAC address includes a trunk identifier of the vLAG port on which the packet was received, and computer readable program code configured for forwarding the packet to an ISL port.

According to the embodiments and approaches described herein, there is no need for a special synchronization mechanism as compared to conventional methods of IP multicast group entry. Also, there is no special processing required for these packets at the peer node or switch (other than recognizing that the packet is received on a vLAG port and processing the packet accordingly), since the standard IGMP packet is passed peer-to-peer, with the LSB changed.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
    at least one local processor configured to execute logic;
    logic configured to receive a packet from an access switch on a virtual link aggregation (vLAG) port of a first switch;
    logic configured to modify a source media access control (MAC) address of the packet to include a MAC address of the first switch, wherein a last byte of the modified source MAC address includes a trunk identifier of the vLAG port on which the packet was received; and
    logic configured to forward the packet to an inter-switch link (ISL) port.

2. The system as recited in claim 1, wherein internet group management protocol (IGMP) report comprises the packet or the packet comprises the IGMP report.

3. The system as recited in claim 1, wherein the logic configured to forward the packet to the ISL port further comprises logic configured to send the packet to a second switch.

4. The system as recited in claim 3, wherein the second switch uses the vLAG trunk identifier to configure data forwarding between the first switch and the second switch.

5. The system as recited in claim 3, wherein the first switch and the second switch are aggregator switches, wherein the packet is a protocol independent multicast (PIM) packet, and wherein the trunk identifier is an eight bit value uniquely identifying the vLAG port on which the packet was received.

6. The system as recited in claim 1, with the proviso that a packet received on a port other than a vLAG port is not modified prior to forwarding the packet to the ISL.

7. A computer program product, the computer program product comprising a computer readable storage medium having computer readable program code embodied therewith, the computer readable program code comprising:
    computer readable program code configured for receiving a packet from an access switch on a virtual link aggregation (vLAG) port of a first switch;
    computer readable program code configured for modifying a source media access control (MAC) address of the packet to include a MAC address of the first switch, wherein a last byte of the modified source MAC address includes a trunk identifier of the vLAG port on which the packet was received; and
    computer readable program code configured for forwarding the packet to an inter-switch link (ISL) port.

8. The computer program product as recited in claim 7, wherein an internet group management protocol (IGMP) report comprises the packet or the packet comprises the IGMP report.

9. The computer program product as recited in claim 7, wherein the computer readable program code configured for forwarding the packet to the ISL port further comprises sending the packet to a second switch.

10. The computer program product as recited in claim 9, wherein the second switch uses the vLAG trunk identifier to configure data forwarding between the first switch and the second switch.

11. The computer program product as recited in claim 9, wherein the first switch and the second switch are aggregator switches, and wherein the trunk identifier is an eight bit value uniquely identifying the vLAG port on which the packet was received.

12. The computer program product as recited in claim 7, with the proviso that a packet received on a port other than a vLAG port is not modified prior to forwarding the packet to the ISL.

13. A method, comprising:
    receiving a packet from an access switch using a first switch;
    determining whether the packet was received on a virtual link aggregation (vLAG) port of the first switch;
    modifying a source media access control (MAC) address of the packet to include a MAC address of the first switch which received the packet when the packet was received on the vLAG port of the first switch, wherein a last byte of the modified source MAC address includes a trunk identifier of the vLAG port on which the packet was received; and
    forwarding the packet to an inter-switch link (ISL) port connecting the first switch with a second switch.

14. The method as recited in claim 13, wherein the packet is a protocol independent multicast (PIM) packet, an internet group management protocol (IGMP) report comprises the packet, or the packet comprises the IGMP report.

15. The method as recited in claim 13, wherein the forwarding the packet to the ISL port further comprises sending the packet to the second switch.

16. The method as recited in claim 15, wherein the second switch uses the vLAG trunk identifier to configure data forwarding between the first switch and the second switch.

17. The method as recited in claim 15, wherein the first switch and the second switch are aggregator switches, and wherein the trunk identifier is an eight bit value uniquely identifying the vLAG port on which the packet was received.

18. The method as recited in claim 13, with the proviso that a packet received on a port other than a vLAG port is not modified prior to forwarding the packet to the ISL.

19. A system, comprising:
    at least one local processor configured to execute logic;
    logic configured to receive an internet group management protocol (IGMP) report or a protocol independent multicast (PIM) packet from an access switch on a virtual link aggregation (vLAG) port of a first aggregator switch;
    logic configured to modify a source media access control (MAC) address of the packet to include a MAC address of the first aggregator switch, wherein a last byte of the modified source MAC address includes a trunk identifier of the vLAG port on which the packet was received; and logic configured to forward the packet to an inter-switch link (ISL) port on to a second aggregator switch, wherein the second aggregator switch uses the vLAG trunk identifier to configure data forwarding between the first aggregator switch and the second aggregator switch.

20. The system as recited in claim 19, with the proviso that a packet received on a port other than a vLAG port is not modified prior to forwarding the packet to the ISL, and wherein the trunk identifier is an eight bit value uniquely identifying the vLAG port on which the packet was received.

* * * * *